United States Patent [19]

Dorner

[11] Patent Number: 4,465,177

[45] Date of Patent: Aug. 14, 1984

[54] ELEVATOR FOR A CONVEYING SYSTEM

[75] Inventor: Wolfgang C. Dorner, Oconomowoc, Wis.

[73] Assignee: Dorner Mfg. Corp., Hartland, Wis.

[21] Appl. No.: 350,287

[22] Filed: Feb. 18, 1982

[51] Int. Cl.³ ............................................. B65G 17/16
[52] U.S. Cl. .................................... 198/482; 198/799
[58] Field of Search ......................... 198/799, 796, 482

[56] References Cited

U.S. PATENT DOCUMENTS

| | | |
|---|---|---|
| 1,564,100 | 12/1925 | Morton . |
| 1,669,060 | 5/1928 | Livingston .......................... 198/799 |
| 3,184,039 | 5/1965 | Czarnecki ........................... 198/154 |
| 3,268,061 | 8/1966 | DeGood et al. ..................... 198/153 |
| 3,481,449 | 12/1969 | Leach .................................. 198/153 |
| 4,214,848 | 7/1980 | Verwey et al. ...................... 198/796 |
| 4,273,234 | 6/1981 | Bourgeois ........................... 198/347 |

FOREIGN PATENT DOCUMENTS

| | | | |
|---|---|---|---|
| 261933 | 12/1926 | United Kingdom ................. | 198/799 |
| 741072 | 11/1955 | United Kingdom ................. | 198/799 |

*Primary Examiner*—H. Grant Skaggs

*Attorney, Agent, or Firm*—Andrus, Sceales, Starke & Sawall

[57] ABSTRACT

An elevator for a conveyor system and adapted to move articles between two different vertical levels. The elevator comprises a pair of endless chains mounted to travel in parallel offset vertical paths. The opposite corners of a plurality of platforms or carriers are connected to the respective chains and as the chains move in their paths of travel, the platforms move in a generally rectangular path consisting of an upward vertical run, an upper horizontal run, a downward vertical run, and a lower horizontal run. Horizontal conveyors located at different vertical levels intersect the vertical runs of the platforms, and the platforms are provided with recesses so that the platforms can move vertically around the conveyors. Articles to be conveyed are delivered to the elevator by one of said conveyors, and are individually lifted from the conveyor by a platform moving in the upward vertical run. The platform carrying the articles is then transferred horizontally and the article is subsequently deposited on the second conveyor as the platform moves in its downward vertical run.

4 Claims, 4 Drawing Figures

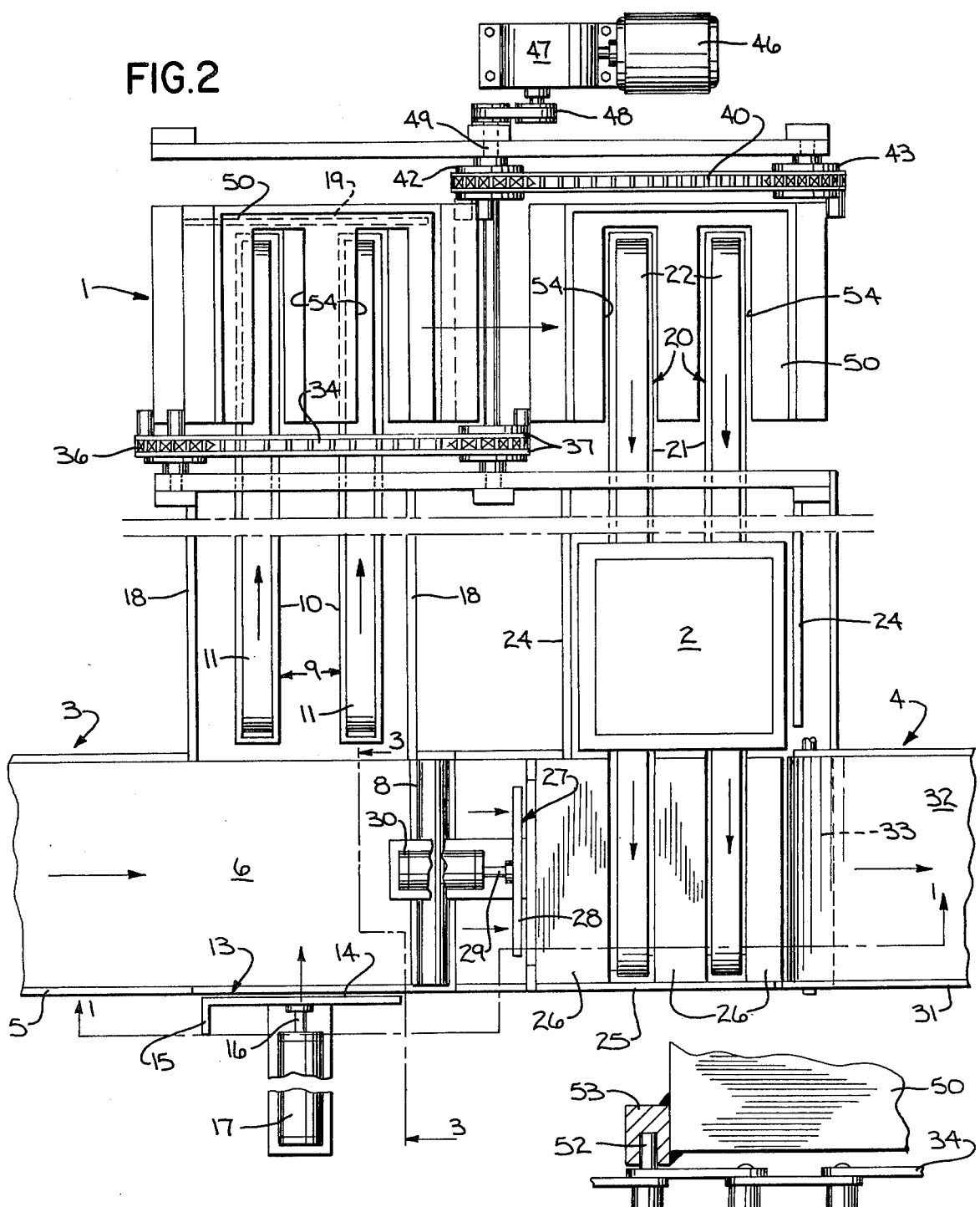

ELEVATOR FOR A CONVEYING SYSTEM

BACKGROUND OF THE INVENTION

Automatic conveyors systems are used to convey or route articles between work stations, or other locations, and in many conveyor systems it is desirable to move the articles from one vertical level to another. Frequently, inclined endless belt or cleat conveyors are employed to move articles between different vertical layers, but the inclined conveyor, due to the fact that it must operate at a relatively gradual slope, requires substantial floor space.

Vertical type elevators have also been employed in the past to move articles between different levels in a conveying system. In one common form of elevator, a chain is carried by a pair of vertically disposed sprockets and a series of rigid platforms extend outwardly at intervals throughout the length of the chain. As the chain moves in its upward vertical run, articles to be conveyed are introduced onto the platform at a lower level and the articles are subsequently removed from the platforms at an upper level in the vertical run. While elevators of this type require less floor space than inclined conveyors, it is necessary in the conventional vertical elevator to momentarily stop operation of the elevator in order that the article can be removed from the platform or carrier and delivered to an adjacent conveyor.

SUMMARY OF THE INVENTION

The invention is directed to an improved elevator for a conveyor system which is capable of receiving articles from one conveyor and delivering the articles to a second conveyor at a different level in continuous operation. In accordance with the invention, the elevator comprises a pair of chains mounted to travel in parallel, offset, vertical path of travel. The opposite corners of a plurality of platforms or carriers are connected to the respective chains and as the chains move in synchronization in their respective paths of travel, the platforms will move in a generally rectangular path consisting of an upward vertical run, an upper horizontal run, a downward vertical run and a lower horizontal run. With this construction, the platforms will remain in a horizontal attitude at all times in their path of travel.

The articles are delivered to the elevator by a first horizontal conveyor and are discharged from the elevator onto a second horizontal conveyor which is located at a different level than the first conveyor. The ends of the conveyors intersect the vertical runs of the platforms, and to accommodate the conveyors, the platforms are provided with recesses so that the platforms can move vertically relative to the conveyors.

In operation, the articles are conveyed to the end of the first conveyor which is located in the upward vertical run of the platforms. As a platform moves upwardly in its upward vertical run, it picks the article from the first conveyor and moves it vertically, then horizontally in the upper horizontal run and then downwardly in the downward vertical run. As the platform moves downwardly past the second conveyor, the article is lowered onto the end of the second conveyor and is then conveyed outwardly away from the elevator.

The invention provides a compact unit in which articles can be transferred between different vertical levels in a conveyor system. As the platforms or carriers are at all times maintained in a horizontal attitude there is no danger of spilling any materials which may be contained within the articles being conveyed.

In addition, the elevator of the invention enables the articles to be transferred from the first conveyor to the elevator and from the elevator to the second conveyor without an interruption in the movement of the elevator or the conveyor systems. This is a substantial improvement over other elevators as used in the past in which it was necessary to momentarily interrupt the operation of the elevator in order to discharge the article from the elevator.

Other objects and advantages will appear in the course of the following description.

DESCRIPTION OF THE DRAWINGS

The drawings illustrate the best mode presently contemplated of carrying out the invention.

In the drawings:

FIG. 2 is a top view of the conveyor system shown in FIG. 1;

FIG. 3 is a section taken along line 3—3 of FIG. 2 and showing the pusher unit; and FIG. 4 is a section showing the pivotal connection between one of the chains and the platform.

DESCRIPTION OF THE PREFERRED EMBODIMENT

Figure 1:
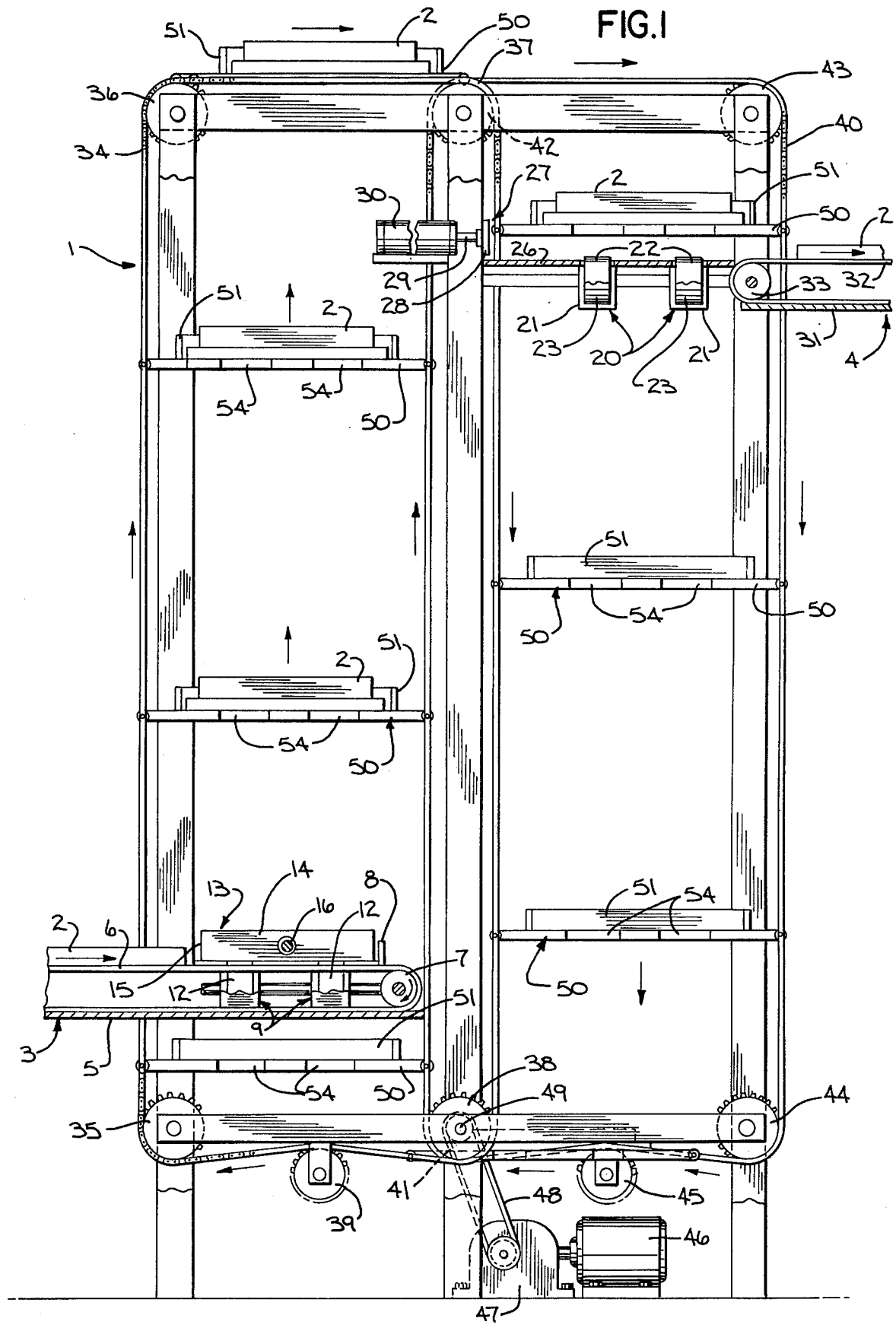
FIG. 1 is a schematic side view of a conveyor system utilizing the elevator of the invention.

FIG. 1 is a schematic representation of a conveyor system utilizing the elevator 1 of the invention. The elevator is adapted to transport a series of articles 2 from one conveyor 3 to a second conveyor 4 located at a different vertical level. As shown in the drawings, the elevator operates to transfer the articles from the lower conveyor 3 to the upper conveyor 4, but the elevator can also be employed to transfer articles from the upper conveyor to the lower conveyor.

The conveyor 3 is a conventional endless belt conveyor and can be constructed in the manner shown in U.S. Pat. No. 3,923,148. In general, the conveyor 3 includes a supporting channel-shaped frame 5 and an endless conveyor belt 6 is carried by a pair of rolls 7, only one of which is shown, that are journalled within the side walls of the frame 5. A stop 8 is located at the end of the conveyor 3 and serves to stop or limit the travel of the articles 2 moving on the belt 6.

A pair of spaced, parallel endless belt conveyors 9 extend laterally from the end of conveyor 3 and serve to convey the articles 2 from the conveyor 3 to the elevator 1. Each conveyor 9 is constructed in a manner similar to conveyor 3 and includes a channel-shaped frame 10 and an endless belt 11, which is carried by rollers 12 that are journalled within the sides of the frame 10. Conveyors 9 can be driven in a conventional manner in which a motor, not shown, operates through a gear reduction drive and the output of the gear drive is operably connected to the shaft of one of the rollers 12.

To transfer the articles from the conveyor 3 to the conveyors 9 a pusher unit 13 is utilized. The pusher unit 13 includes a pusher plate 14 having a rearwardly extending flange 15, and the plate 14 is connected to the piston rod 16 of a fluid cylinder 17. By extending the piston rod 16, the pusher plate will push the articles 2 laterally of the conveyor 3 and onto the paralled conveyors 9. It is contemplated that other conventional mechanisms can be utilized in place of the pusher unit 13 to transfer the articles from conveyor 3 to conveyors 9.

Guide rails 18 are located outwardly of the conveyors 9 and serve to guide the articles as they are being conveyed to the elevator 1. In addition, a stop rail 19 is located at the end of the conveyors 9 to limit the travel of articles on the conveyors.

A pair of spaced, parallel endless belt conveyors 20 serve to convey the articles 2 from the elevator 1 to the upper conveyor 4. Conveyors 20 are similar in construction to conveyors 9 and each conveyor 20 includes a frame 21 and an endless belt 22 is carried by a pair of rollers 23 that are journalled within the side walls of the frame 21. The articles being conveyed on the conveyors 20 are guided by a pair of guide rails 24.

A stop 25 is located transversely across the end of the conveyors 20 to limit the travel of the articles being conveyed on the conveyors. Spacer plates 26 are positioned between the spaced conveyor belts 22 adjacent the stop bar 25 and provide a supporting surface for articles disposed in engagement with the stop bar 25.

The articles 2 are transferred from the conveyor 20 onto the conveyor 4 by a pusher unit 27, similar in construction to pusher unit 13. The pusher unit 27 includes a pusher plate 28 that is attached to the outer end of a piston rod 29 slidable within the fluid cylinder 30. By extending piston rod 29, pusher plate 28 will be moved laterally from conveyors 20 onto the conveyor 4.

The conveyor 4 is constructed in a manner similar to conveyor 3 and includes a channel-shaped frame 31 and an endless conveyor belt 32 is carried by rollers 33 that are journalled within the sides of the frames 31. One of the rollers 33 is driven in the conventional manner to move the belt in the direction of the arrow, as shown in FIG. 2.

The elevator 1 includes an endless chain 34 which is carried by a plurality of sprockets 35, 36, 37 and 38 which are disposed in rectangular configuration. In addition, a tensioning sprocket 39 is located between the sprockets 35 and 38 and acts in a conventional manner to maintain the proper tension on the chain 34.

While the chains 34 and 40 are shown as moving in generally rectangular paths, the chains can move in paths of other configurations.

In addition to the chain 34, a second chain 40 is located in a parallel offset relation to the chain 34. Chain 40 is carried by sprockets 41, 42, 43 and 44 which are similarly disposed in a rectangular configuration. Tensioning sprocket 45, similar to sprocket 39, is employed to maintain the proper tension on the chain 40. Curved slides can be substituted for the sprockets 36, 37, 42 and 43 in which case the chains would slide around the curved or radiused members.

The two chains 34 and 40 are driven in synchronization by a motor 46 which is operably connected through gear reduction drive 47, and the output shaft of the gear drive is connected by a chain drive 48 to horizontal shaft 49 which carries the sprockets 38 and 41. With this construction, operation of the motor 46 acts to drive the two chains 34 and 40 in synchronization.

A plurality of carriers or platforms 50 are connected to the chains 34 and 40. Each platform 50 is provided with a peripheral upstanding rail or flange 51 which prevents the articles 2 from being displaced or dislodged from the platform. As best shown in FIG. 2, each platform 50 is connected at diagonally opposite corners to the respective chains 34 and 40. To provide this connection, a series of roller links of the chains 34 and 40 are extended, as indicated by 52, and are received within sockets 53 mounted at the corners of the platform. The pivotal connection between the platform 50 and the chains 34 and 40 enables the platforms to move in a generally rectangular path of travel which includes an upward vertical run, an upper horizontal run, a downward vertical run and a lower horizontal run.

As best shown in FIG. 2, the forward edge of each platform 50 is provided with a pair of parallel slots 54 to permit the platforms to move vertically relative to the conveyors 9 and 20.

In operation of the conveying system, the articles 2 are conveyed on the conveyor 3 and engage the end stop 8. The pusher unit 13 is then actuated to push the article onto the conveyors 9 where it is conveyed to the end of the conveyor in a position where it intersects the upward vertical run of the platforms. The next succeeding platform 50 moving in the upward run will pick the article from the conveyors 9 and move the article to the top of the elevator, then horizontally and then downwardly in the downward run. As the platform carrying the article passes downwardly toward the conveyors 20, the article will be deposited on the conveyors 20 and will then be conveyed to the end of the conveyors where it will engage the stop 25. Pusher unit 27 is then actuated to move the article from the conveyors 20 onto the discharge conveyor 4.

The elevator of the invention is a compact unit which is capable of moving articles to different vertical elevations. During the movement the articles are maintained in a horizontal attitude so that there is no possibility of the articles being tilted or tipped as they are moved by the elevator. The elevator can be operated without interruption and it is not necessary to stop the operation of the elevator to transfer articles from the delivering conveyor 3 to the elevator or from the elevator to the discharge conveyor 4.

While the above description has illustrated the articles 2 being transferred from a lower conveyor 3 to an upper conveyor 4, it is contemplated that the elevator can be used to transfer articles from an upper level conveyor to a lower level conveyor. Similarly, the conveyors 3 and 4, while at different levels need not be parallel.

Various modes of carrying out the invention are contemplated as being within the scope of the following claims particularly pointing out and distinctly claiming the subject matter which is regarded as the invention.

I claim:

1. An elevator for a conveyor system, comprising a first flexible endless member disposed to travel in a first generally rectangular path of travel, a second flexible endless member disposed to travel in a second generally rectangular path of travel, said second path of travel lying in a plane parallel to said first path of travel and offset from said first path of travel, a plurality of carriers adapted to support articles to be conveyed, opposed corner portions of each carrier being pivotally connected to the respective endless members, drive means to drive the endless members in synchronization, whereby said carriers move in a generally rectangular path of travel including an upward vertical run, an upper horizontal run, a downward vertical run and a lower horizontal run, delivery conveyor means having one end intersecting the upward vertical run of said carriers, and discharge conveyor means disposed at a different level than said delivery conveyor means and having an end intersecting the downward vertical run of said carriers, said delivery and discharge conveyor means being disposed in generally parallel offset relation, each carrier being provided with at least one recess to receive the respective delivery conveyor means and discharge conveyor means, each recess extending from one side of the respective carrier past the center thereof to a location in close proximity to the opposite side of said carrier, movement of said carriers in said upward vertical run acting to pick an article from said delivery conveyor means and movement of said article in said downward vertical run acting to deposit said article on said discharge conveyor means.

2. The elevator of claim 1, wherein said endless members comprise separate chain drives with each chain drive including a chain and a plurality of sprockets to carry the chain, the sprockets of each chain drive being arranged in rectangular configuration and including a pair of upper sprockets and a pair of lower sprockets, one of the upper sprockets of a first of said chain drives being in axial alignment with one of the upper sprockets of a second of said chain drives and one of the lower sprockets of said first chain drive being in axial alignment with one of the lower sprockets of said second chain drive.

3. The elevator of claim 2, and including a shaft interconnecting a pair of aligned sprockets in said first and second chain drives, said drive means being operably connected to said shaft.

4. The elevator of claim 1, wherein said delivery and discharge conveyor means each comprise a pair of spaced parallel conveyor belts and each of said carriers is provided with a pair of spaced parallel recesses in said one side to receive said conveyor belts.

* * * * *